United States Patent
Tang et al.

(10) Patent No.: US 10,653,960 B2
(45) Date of Patent: May 19, 2020

(54) METHOD FOR CONTROLLING INTERACTION WITH VIRTUAL TARGET, TERMINAL, AND STORAGE MEDIUM

(71) Applicant: TENCENT TECHNOLOGY (SHENZHEN) COMPANY LIMITED, Shenzhen (CN)

(72) Inventors: Yong Tang, Shenzhen (CN); Changyan Liao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 117 days.

(21) Appl. No.: 15/691,073

(22) Filed: Aug. 30, 2017

(65) Prior Publication Data

US 2017/0361230 A1    Dec. 21, 2017

Related U.S. Application Data

(63) Continuation of application No. PCT/CN2016/081484, filed on May 10, 2016.

(30) Foreign Application Priority Data

Jun. 16, 2015 (CN) .......................... 2015 1 0332892

(51) Int. Cl.
*A63F 13/56* (2014.01)
*A63F 13/422* (2014.01)
(Continued)

(52) U.S. Cl.
CPC ............ *A63F 13/56* (2014.09); *A63F 13/422* (2014.09); *A63F 13/58* (2014.09); *A63F 13/426* (2014.09);
(Continued)

(58) Field of Classification Search
CPC .......... A63F 13/56; A63F 13/422; A63F 13/58
See application file for complete search history.

(56) References Cited

U.S. PATENT DOCUMENTS

| 2004/0176163 A1* | 9/2004 | Ishihata ................. A63F 13/10 463/30 |
| 2015/0057085 A1 | 2/2015 | Tagawa et al. |

(Continued)

FOREIGN PATENT DOCUMENTS

| CN | 101515373 A | 8/2009 |
| CN | 102750435 A | 10/2012 |

(Continued)

OTHER PUBLICATIONS

The World Intellectual Property Organization (WIPO) International Search Report for PCT/CN2016/081484 dated Aug. 10, 2016 pp. 1-2.
(Continued)

*Primary Examiner* — William H McCulloch, Jr.
*Assistant Examiner* — Yingchuan Zhang
(74) *Attorney, Agent, or Firm* — Anova Law Group, PLLC

(57) ABSTRACT

A method for controlling interaction with a virtual target includes: obtaining an interaction instruction; detecting whether there is a virtual target within an interaction distance range corresponding to the interaction instruction; after a plurality of virtual targets are detected within the interaction distance range, obtaining preset priority data; selecting a virtual target within the interaction distance range according to the priority data; and controlling, according to the interaction instruction, a controlled virtual character to interact with the selected virtual target.

20 Claims, 8 Drawing Sheets

---

S402: Obtain levels of virtual targets within the interaction distance range, and select a virtual target having a highest level S404: Select, according to the priority data, a virtual target closest to the controlled virtual character in virtual targets having the highest level, or a virtual target having a smallest attribute value in virtual targets having the highest level

(51) Int. Cl.
  *A63F 13/58*    (2014.01)
  *A63F 13/426*   (2014.01)
  *A63F 13/822*   (2014.01)
  *G06F 3/0484*   (2013.01)

(52) U.S. Cl.
  CPC ........ *A63F 13/822* (2014.09); *G06F 3/04842* (2013.01)

(56) References Cited

U.S. PATENT DOCUMENTS

| | | | |
|---|---|---|---|
| 2015/0157940 A1 | 6/2015 | Hall | |
| 2015/0346964 A1* | 12/2015 | Tamura | A63F 13/57 463/2 |

FOREIGN PATENT DOCUMENTS

| | | |
|---|---|---|
| CN | 103501287 A | 1/2014 |
| CN | 103593546 A | 2/2014 |
| CN | 103729533 A | 4/2014 |
| CN | 104635925 A | 5/2015 |
| CN | 104915117 A | 9/2015 |
| JP | 2001149655 A | 6/2001 |
| JP | 2003079952 A | 3/2003 |
| JP | 2003088683 A | 3/2003 |
| JP | 2004174017 A | 6/2004 |
| JP | 2006122123 A | 5/2006 |
| JP | 2008188322 A | 8/2008 |
| JP | 2015019885 A | 2/2015 |
| JP | 2015039386 A | 3/2015 |
| WO | 2014200255 A1 | 12/2014 |

OTHER PUBLICATIONS

The State Intellectual Property Office of the People's Republic of China (SIPO) Office Action 1 for 201510332892.X dated Jun. 20, 2016 pp. 1-7.

European Patent Office (EPO) European search report for 16810860.3 dated Mar. 19, 2018 10 pages.

The Japan Patent Office (JPO) Office Action for Application No. 2017-565254 dated Dec. 21, 2018 5 Pages (including translation).

JEEPSTER2K3, "Target Selector Explanation—BoL Studio—Bot of Legends", Mar. 17, 2013 (Mar. 17, 2013), XP055457938, Retrieved from the Internet:URL: https://forum.botoflegends.com/topic/3213-target-selector-explaination/ [retrieved on Mar. 9, 2018], the whole document 2 Pages.

Anonymous: "BoL-Scripts/target_selector.lua at master. SurfaceS/BoL-Scripts. GitHub", Jul. 22, 2012 (Jul. 22, 2012), XP055457945, Retrieved from the Internet:URL: https://github.com/SurfaceS/BoL-Scripts/blob/master/Scripts/Libs/target_selector.lua, [retrieved on Mar. 9, 2018], the whole document 6 Pages.

Raeth, "SAC:R & Target Selection—General—bot of Legends", Apr. 15, 2015 (Apr. 15, 2015), XP055457949, Retrieved from the Internet:URL: https://forum.botoflegends.com/topic/59311-sacr-target-selection/, [retrieved on Mar. 9, 2018], the whole document 4 Pages.

Korean Intellectual Property Office (KIPO) Office Action 1 for 10-2017-703916 dated Jan. 9, 2019 11 Pages (including translation).

The Japan Patent Office (JPO) Notification of Reasons for Refusal for Application No. 2017-565254 and Translation dated Jul. 8, 2019 4 Pages.

* cited by examiner

METHOD FOR CONTROLLING INTERACTION WITH VIRTUAL TARGET, TERMINAL, AND STORAGE MEDIUM

CROSS-REFERENCES TO RELATED APPLICATION

This application is a continuation application of PCT Patent Application No. PCT/CN2016/081484, filed on May 10, 2016, which claims priority to Chinese Patent Application No. 201510332892.X, entitled "METHOD AND APPARATUS FOR CONTROLLING INTERACTION WITH VIRTUAL TARGET", filed on Jun. 16, 2015, the entire contents of both of which are incorporated herein by reference.

FIELD OF THE TECHNOLOGY

The present disclosure relates to the field of computer technologies, and in particular, to a method for controlling interaction with a virtual target, a terminal, and a storage medium.

BACKGROUND OF THE DISCLOSURE

With rapid development of computer technologies, computer technologies bring much convenience to people's life, and greatly improve people's quality of life. While enjoying convenience of life, people also need entertainment. In this case, various game products are developed. During a game process, a controlled virtual character may select, in a game scenario, one or more virtual targets as objects for interaction.

However, in a conventional game scenario, after an interaction instruction is obtained, a virtual target that is closest to a controlled virtual character is selected by default for interaction. If the selected virtual target is not a virtual target that the controlled virtual character attempts to interact with, then a position of the controlled virtual character needs to be adjusted by obtaining another instruction, which generates unnecessary data processing and causes resource waste.

SUMMARY

Based on that, for the foregoing technical problem, it is necessary to provide a method for controlling interaction with a virtual target, a terminal, and a storage medium that are capable of reducing resource waste.

A method for controlling interaction with a virtual target includes the following steps: obtaining an interaction instruction; detecting whether there is a virtual target within an interaction distance range corresponding to the interaction instruction, after a plurality of virtual targets are detected within the interaction distance range, obtaining preset priority data, and selecting a virtual target within the interaction distance range according to the priority data; and controlling, according to the interaction instruction, a controlled virtual character to interact with the selected virtual target.

A terminal includes a memory and a processor, the memory storing an instruction, and the instruction enabling, when being performed by the processor, the processor to perform the following steps: obtaining an interaction instruction; detecting whether there is a virtual target within an interaction distance range corresponding to the interaction instruction, after a plurality of virtual targets are detected within the interaction distance range, obtaining preset priority data, and selecting a virtual target within the interaction distance range according to the priority data; and controlling, according to the interaction instruction, a controlled virtual character to interact with the selected virtual target.

A non-volatile storage medium that stores computer readable instructions are provided, the computer readable instructions enabling, when being performed by one or more processors, the one or more processors to perform the following steps: obtaining an interaction instruction; detecting whether there is a virtual target within an interaction distance range corresponding to the interaction instruction, after a plurality of virtual targets are detected within the interaction distance range, obtaining preset priority data, and selecting a virtual target within the interaction distance range according to the priority data; and controlling, according to the interaction instruction, a controlled virtual character to interact with the selected virtual target.

By means of obtaining an interaction instruction, detecting whether there is a virtual target within an interaction distance range corresponding to the interaction instruction, and if yes, obtaining preset priority data, selecting a virtual target within the interaction distance range according to the priority data, and finally controlling, according to the interaction instruction, a controlled virtual character to interact with the selected virtual target, the foregoing method for controlling interaction with a virtual target, terminal, and storage medium can select, as compared with selecting a virtual target closest to a controlled virtual character by default for interaction in the conventional method, a more appropriate virtual target for interaction within the interaction distance range according to the preset priority data, thereby reducing resource waste.

BRIEF DESCRIPTION OF THE DRAWINGS

To describe the technical solutions in the embodiments of the present invention or in the existing technology more clearly, the following briefly introduces the accompanying drawings required for describing the embodiments or the existing technology. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make objectives, technical solutions, and advantages of the present disclosure clearer, the present disclosure is described in detail below with reference to accompanying drawings and embodiments. It should be understood that the specific embodiments described herein are merely intended to explain the present disclosure, and are not intended to limit the present disclosure.

It may be understood that as used in the present disclosure, terms such as "first" and "second" may be used to describe various elements, but the elements are not limited by the terms. The terms are merely intended to distinguish a first element from another element.

Figure 1:
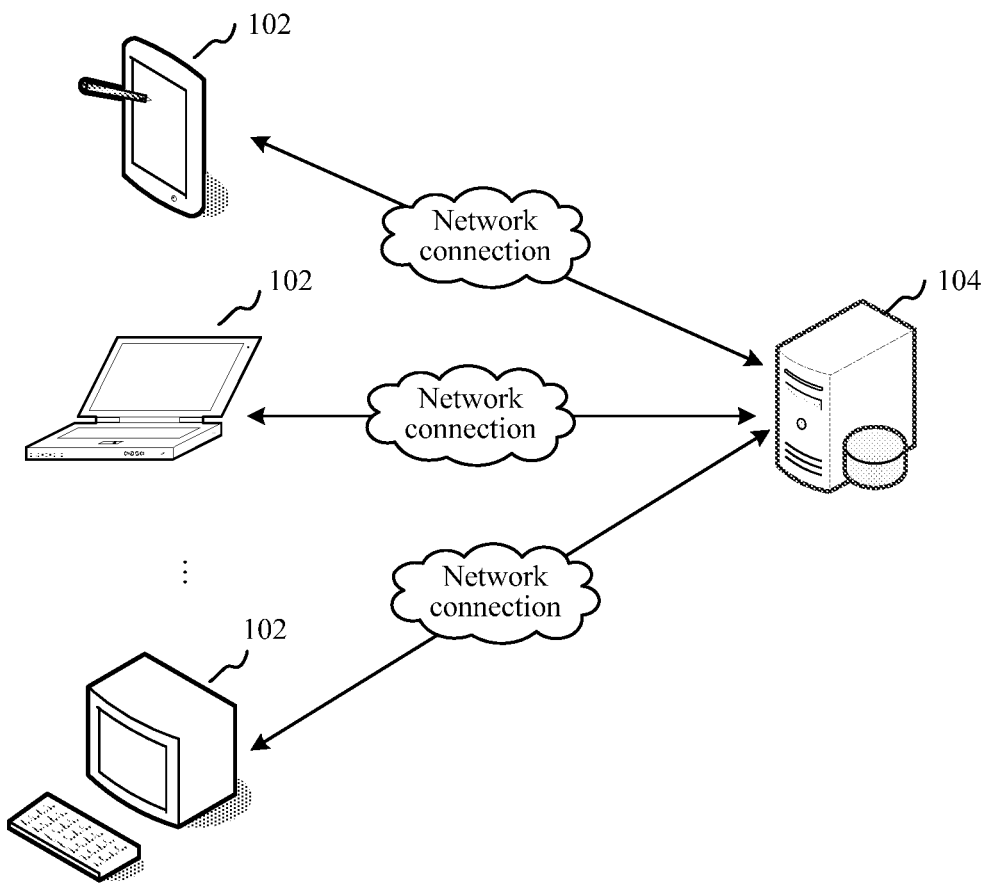
FIG. 1 is a diagram of an application environment of implementation of a method for controlling interaction with a virtual target according to an embodiment.

As shown in FIG. 1, FIG. 1 is a diagram of an application environment of implementation of a method for controlling interaction with a virtual target according to an embodiment. The application environment includes a terminal 102 and a server 104. The terminal 102 may be a mobile phone, a personal computer, a tablet computer, a desktop computer, or the like. The terminal 102 communicates with the server 104 by using a network.

Figure 2:
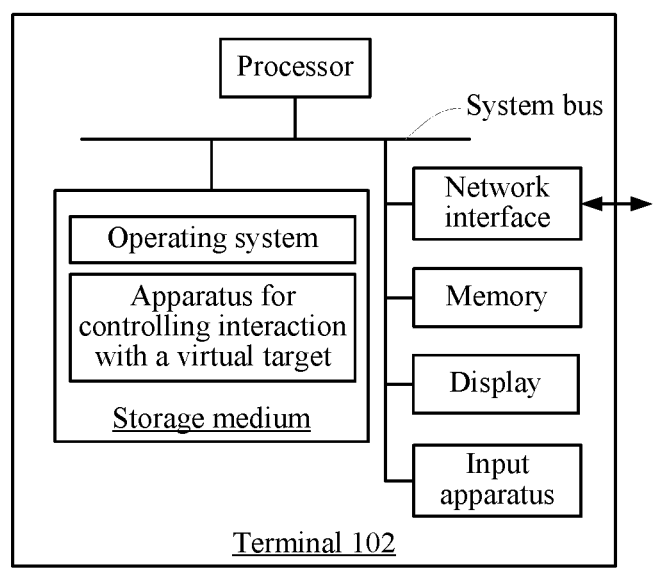
FIG. 2 is a schematic diagram of an internal structure of a terminal according to an embodiment.

In an embodiment, a schematic diagram of an internal structure of the terminal 102 in the foregoing FIG. 1 is as shown in FIG. 2. The terminal 102 includes a processor, a storage medium, a memory, a network interface, a display, and an input apparatus that are connected by using a system bus. The storage medium of the terminal stores an operating system, and further includes an apparatus for controlling interaction with a virtual target. The apparatus for controlling interaction with a virtual target is configured to implement a method for controlling interaction with a virtual target (e.g., by the processor) after an interaction instruction is detected and obtained (e.g., by the input apparatus). The processor is configured to provide calculation and controlling capabilities, and to support running of the entire terminal 102. The memory in the terminal 102 provides an environment for running of the apparatus for controlling interaction with a virtual target in the storage medium. The network interface is configured to perform network communication with the server 104, for example, uploading data of a virtual character and a virtual target to the server 104, and receiving data related to the virtual character and the virtual target that is returned by the server 104. The display of the terminal 102 is configured to display an operation interface of a game scenario, and the like. The input apparatus may be a touch layer covering the display, or may be a button, a track ball, or a touch board disposed on a housing of the terminal 102, or may be an external keyboard, touch board, or mouse, or the like. Persons skilled in the prior art may understand that, the structure shown in FIG. 2 is merely a block diagram of a part of the structure related to the solution of this application, and does not limit a terminal to which the solution of this application is applied. A specific terminal may include more or less components than the components shown in the figure, or combine some components, or have different component layout.

Figure 3:
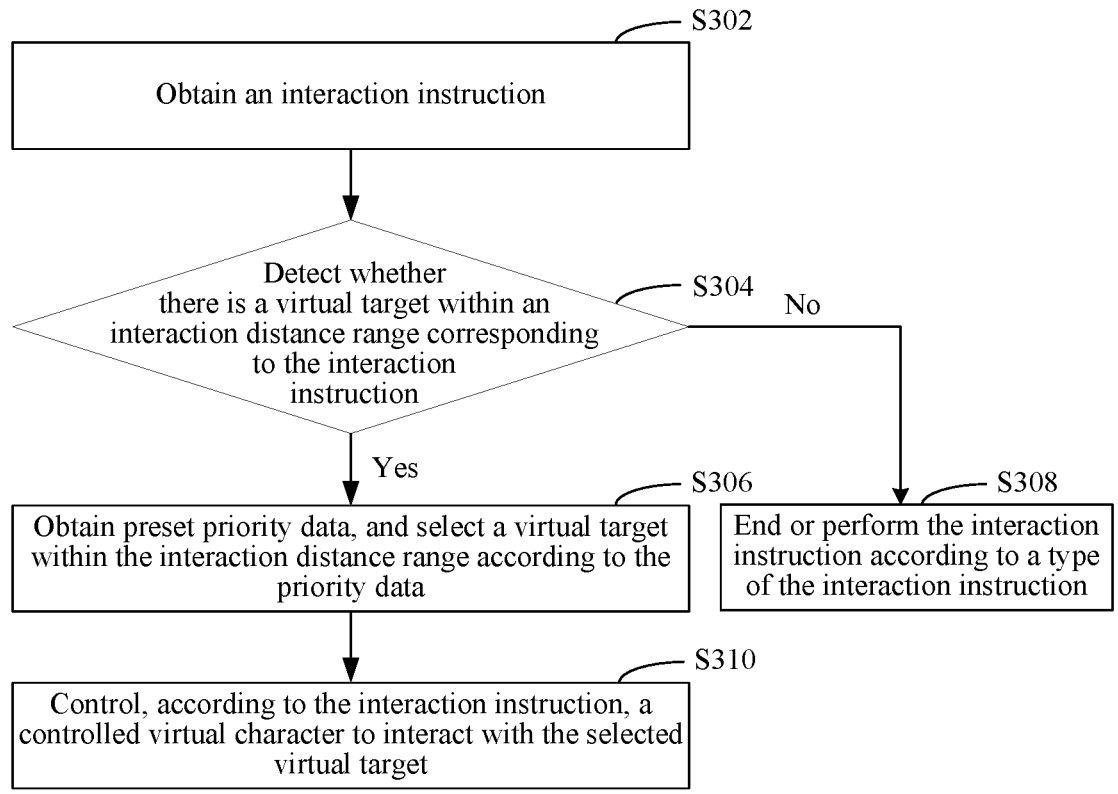
FIG. 3 is a flowchart of a method for controlling interaction with a virtual target according to an embodiment.

FIG. 3 is a flowchart of a method for controlling interaction with a virtual target according to an embodiment. Running the method for controlling interaction with a virtual target shown in FIG. 3 in the terminal 102 in FIG. 2 is used as an example for description. The method for controlling interaction with a virtual target includes the following steps:

Step S302: Obtaining an interaction instruction.

The interaction instruction herein refers to an instruction of controlling a controlled virtual character to interact with a virtual target. Specifically, an interaction instruction input by a user is obtained by means of a provided operation interface. For example, in a game scenario, an interaction instruction input by a user may be obtained by means of an operation interface in the game scenario, and the interaction instruction includes, but is not limited to, various attack instructions, dialog instructions, and the like. Specifically, an interaction instruction may be obtained by using an I/O device. The I/O device may be a mouse, a keyboard, a touchscreen, or the like. For example, when a user clicks, by using a touchscreen, a skill button or a virtual target in a terminal, an interaction instruction is generated.

Step S304: Detecting whether there is a virtual target within an interaction distance range corresponding to the interaction instruction, and if yes, performing step S306; otherwise, performing step S308.

The interaction distance range herein refers to a distance range in which an interaction instruction can have an effect. Specifically, different interaction instructions correspond to different interaction distance ranges. After the interaction instruction is obtained, first, location data of a controlled virtual character and each virtual target in a scenario needs to be obtained, and a distance between each virtual target and the controlled virtual character in the scenario is calculated according to the location data of the virtual target and the controlled virtual character. If a distance between a virtual target and the controlled virtual character is less than or equal to an interaction distance corresponding to the interaction instruction, the virtual target falls within an interaction distance range corresponding to the interaction instruction, otherwise, the virtual target goes beyond the interaction distance range corresponding to the interaction instruction.

For example, in a game scenario, if an interaction distance corresponding to a normal attack instruction is 5 meters, and an interaction distance corresponding to a skill casting instruction is 7 meters, and therefore, when an obtained interaction instruction is a normal attack instruction, location data of a controlled virtual character and each virtual target in the scenario is obtained, a distance between each virtual target and the controlled virtual character is calculated according to the location data of the virtual target and the controlled virtual character, and whether there is a virtual target within 5 meters away from the controlled virtual character in the scenario is detected. When the obtained interaction instruction is a skill casting instruction, whether there is a virtual target within 7 meters away from the controlled virtual character in the scenario is detected.

Step S306: Obtaining preset priority data, and selecting a virtual target within the interaction distance range according to the priority data.

Specifically, the preset priority data refers to priority condition data for selecting from various types of virtual targets, and a condition of selecting a virtual target of a higher priority may be preset according to actual requirements. A setup interface may be provided, so that a user sets a condition of selecting a virtual target, for example, setting, in a game scenario by using the provided setup interface, a priority condition of selecting a virtual target as a distance priority, a target attribute value priority, or the like. The priority data may indicate preferentially selecting a virtual target with a smaller distance, or preferentially selecting a virtual target with a smaller attribute value, or the like. In some embodiments, the priority data may be default data provided by the game application.

In an embodiment, the terminal obtains, by using the setup interface, the priority data input by the user, and may store the priority data in a storage device according to an identifier of the controlled virtual character. The terminal may further upload the identifier of the controlled virtual character and the corresponding priority data to the storage device of the server for storage. Therefore, when the terminal cannot locally obtain the priority data, the terminal may obtain the priority data corresponding to the identifier of the controlled virtual character from the storage device of the server.

For example, if the preset priority data indicates preferentially selecting a virtual target with a smaller distance, during selection of a virtual target, a closest virtual target is preferentially selected. In an embodiment, if there are more than two closest virtual targets, a virtual target is randomly selected, or a virtual target with a smallest attribute value is selected from the more than two virtual targets. If the preset priority data indicates preferentially selecting a virtual target with a smaller attribute value, during selection of a virtual target, a virtual target with a smallest attribute value is preferentially selected. In an embodiment, if there are more than two virtual targets with the smallest attribute value, a virtual target is randomly selected or a closest virtual target is selected from the more than two virtual targets.

Step S308: Ending or performing the interaction instruction according to a type of the interaction instruction. The interaction process and result may be displayed on the user terminal (e.g., a skill casting effect that gradually alternates the appearance and/or surrounding presentations of the selected virtual target).

Specifically, in a case in which there is no virtual target within the interaction distance range corresponding to the interaction instruction, some types of interaction instructions can be further performed, but some types of interaction instructions cannot be performed.

For example, in a game scenario, when an obtained interaction instruction is a normal attack instruction or a single-target attack skill instruction, if there is no virtual target within an interaction distance range corresponding to the interaction instruction, the two instructions cannot be performed, and are directly ended; when an obtained interaction instruction is a directional skill instruction, if there is no virtual target within an interaction distance range corresponding to the interaction instruction, then the interaction instruction is performed in a direction that a controlled virtual character faces; and when an obtained interaction instruction is a designated skill instruction, if there is no virtual target within an interaction distance range corresponding to the interaction instruction, the interaction instruction is performed at a default location.

Step S310: Controlling, according to the interaction instruction, a controlled virtual character to interact with the selected virtual target.

Specifically, after a virtual target is selected within the interaction distance range according to the preset priority data, a controlled virtual character may be controlled, according to the interaction instruction, to interact with the selected virtual target.

Besides, data generated by selecting a virtual target and data generated by controlling, according to the interaction instruction, the controlled virtual character to interact with the selected virtual target may be uploaded to the server, thereby implementing data synchronization.

By means of obtaining an interaction instruction, detecting whether there is a virtual target within an interaction distance range corresponding to the interaction instruction, and if yes, obtaining preset priority data, selecting a virtual target within the interaction distance range corresponding to the interaction instruction according to the priority data, and finally controlling, according to the interaction instruction, a controlled virtual character to interact with the selected virtual target, the foregoing method for controlling interaction with a virtual target can select, as compared with selecting a virtual target closest to a controlled virtual character by default for interaction in the conventional method, a more appropriate virtual target for interaction within the interaction distance range according to the preset priority data, thereby reducing resource waste.

Figure 4:
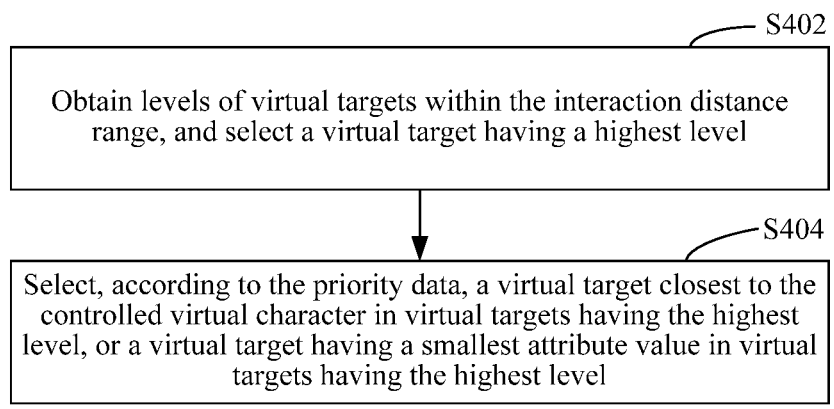
FIG. 4 is a specific flowchart of selecting a virtual target within an interaction distance range according to priority data according to an embodiment.

As shown in FIG. 4, the step of selecting a virtual target within the interaction distance range according to the priority data includes:

Step S402: Obtaining levels corresponding to virtual targets within the interaction distance range, and selecting one or more virtual target having a highest level.

Specifically, the priority data includes a level of a virtual target and a selection priority condition set for virtual targets of different levels. Virtual targets are classified into different levels, and generally, a virtual target having a higher level is preferentially selected, and the like. When there are multiple virtual targets within the interaction distance range corresponding to the interaction instruction in a scenario, first, levels included in the virtual targets within the interaction distance range need to be obtained, and second, a virtual target having a highest level is selected.

For example, in a game scenario, virtual targets may include different target types such as a virtual character, a virtual animal, and a virtual appliance. A virtual character is a first-level virtual target, a virtual animal is a second-level virtual target, and a virtual appliance is a third-level virtual target. If virtual targets within the interaction distance range simultaneously include a first-level virtual target, a second-level virtual target, and a third-level virtual target, the first-level virtual target having the highest level is selected from the three types of virtual targets. If virtual targets within the interaction distance range only include a second-level virtual target and a third-level virtual target, the second-level virtual target having the highest level is selected from the two types of virtual targets. The selection rule is applicable to other cases, and details are not described herein again.

Step S404: Selecting, according to the priority data, a virtual target closest to the controlled virtual character from the one or more virtual targets having the highest level, or a virtual target having a smallest attribute value from the one or more virtual targets having the highest level.

Specifically, multiple virtual targets having the highest level may be selected in step S402, and here, a virtual target is selected, according to the preset priority data, from the multiple virtual targets having the highest level. In an embodiment, a virtual target closest to a controlled virtual character is selected from multiple virtual targets having the highest level. In an embodiment, a virtual target having the smallest attribute value is selected from multiple virtual targets having the highest level.

In an embodiment, steps of obtaining, by means of a setup interface, a first parameter and a second parameter that are inputted and correspond to a type of a controlled virtual character, and storing a correspondence between the type of the controlled virtual character and the first parameter and the second parameter, are further included.

Figure 5:
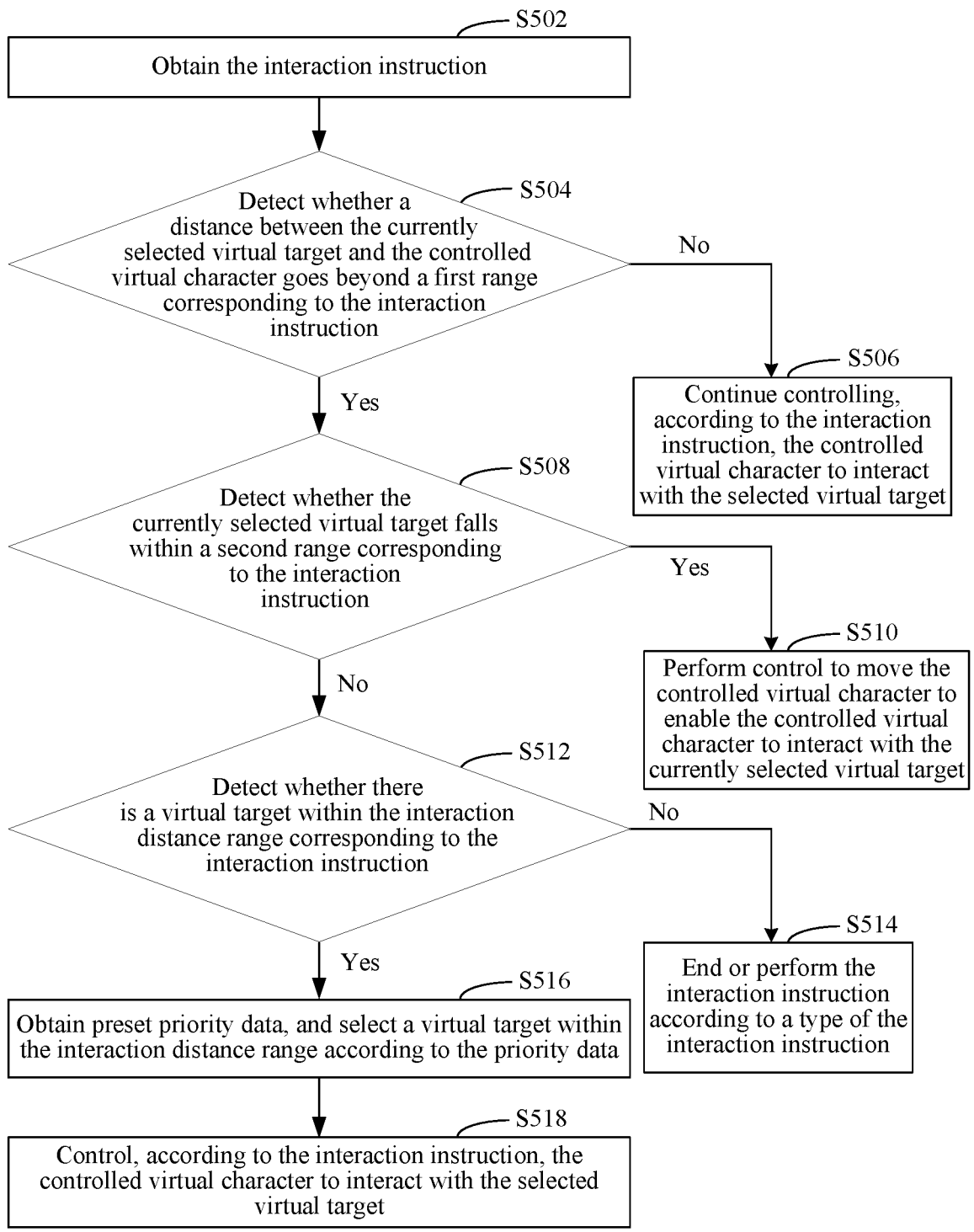
FIG. 5 is a specific flowchart of steps after controlling, according to an interaction instruction, a controlled virtual character to interact with a selected virtual target according to an embodiment.

As shown in FIG. 5, after the controlling, according to the interaction instruction, a controlled virtual character to interact with the selected virtual target, the method further includes:

Step S502: Obtaining the interaction instruction.

Specifically, an interaction instruction input by a user is obtained by means of a provided operation interface. For example, in a game scenario, an interaction instruction input by a user may be obtained by means of an operation interface in the game scenario, and the interaction instruction includes, but is not limited to, various attack instructions, dialog instructions, and the like.

Step S504: Detecting whether a distance between the currently selected virtual target and the controlled virtual character goes beyond a first range corresponding to the interaction instruction, and if not, performing step S506; and if yes, performing step S508.

Specifically, after the interaction instruction is obtained, first, a type of the controlled virtual character is obtained; further, a first parameter and a second parameter that are pre-stored and correspond to the type of the controlled virtual character are obtained; and the first range and the second range are obtained by means of calculation.

The first range is a sum of an interaction distance corresponding to the interaction instruction and the first parameter, and is used to denote the interaction distance range of the controlled virtual character; and the second range is a sum of the interaction distance corresponding to the interaction instruction and the second parameter, and is used to denote a range within which the controlled virtual character searches for a virtual target.

For example, in a game scenario, controlled virtual characters may be classified, according to interaction ranges thereof, short-distance-interaction virtual characters and long-distance-interaction virtual characters. If a controlled virtual character is a short-distance-interaction virtual character, a first range and a second range that correspond to the short-distance-interaction virtual character may be obtained by obtaining a first parameter and a second parameter that correspond to the short-distance-interaction virtual character. Similarly, if a controlled virtual character is a long-distance-interaction virtual character, a first range and a second range that correspond to the long-distance-interaction virtual character may be obtained by obtaining a first parameter and a second parameter that correspond to the long-distance-interaction virtual character.

Step S506: Continuing controlling, according to the interaction instruction, the controlled virtual character to interact with the selected virtual target.

If the distance between the currently selected virtual target and the controlled virtual character falls within the first range corresponding to the interaction instruction, it indicates that the currently selected virtual target falls within the interaction distance range of the controlled virtual character, and the controlled virtual character is continued to be controlled, according to the interaction instruction, to interact with the selected virtual target.

Step S508: Detecting whether the currently selected virtual target falls within a second range corresponding to the interaction instruction, and if yes, performing step S510; and if not, performing step S512.

If the distance between the currently selected virtual target and the controlled virtual character goes beyond the first range corresponding to the interaction instruction, it indicates that the currently selected virtual target goes beyond the interaction distance range of the controlled virtual character, and whether the currently selected virtual target falls within the second range corresponding to the interaction instruction is further detected, that is, searching for the currently selected virtual target within the second range is performed.

Step S510: Performing control to move the controlled virtual character to enable the controlled virtual character to interact with the currently selected virtual target.

If the distance between the currently selected virtual target and the controlled virtual character falls within the second range corresponding to the interaction instruction, control is performed to move the controlled virtual character to enable the controlled virtual character to interact with the currently selected virtual target.

Step S512: Detecting whether there is a virtual target within the interaction distance range corresponding to the interaction instruction, and if not, performing step S514; and if yes, performing step S516.

If the distance between the currently selected virtual target and the controlled virtual character goes beyond the second range corresponding to the interaction instruction, the currently selected virtual target has to be discarded, and whether there is another virtual target within the interaction distance range corresponding to the interaction instruction is detected according to the interaction instruction.

Step S514: Ending or performing the interaction instruction according to a type of the interaction instruction.

Specifically, in a case in which there is no virtual target within the interaction distance range corresponding to the interaction instruction, some types of interaction instructions can be further performed, but some types of interaction instructions cannot be performed.

For example, in a game scenario, when an obtained interaction instruction is a normal attack instruction or a single-target attack skill instruction, if there is no virtual target within an interaction distance range corresponding to the interaction instruction, the two instructions cannot be performed, and are directly ended; when an obtained interaction instruction is a directional skill instruction, if there is no virtual target within an interaction distance range corresponding to the interaction instruction, the interaction instruction is performed in a direction that a controlled virtual character faces; and when an obtained interaction instruction is a designated skill instruction, if there is no virtual target within an interaction distance range corresponding to the interaction instruction, the interaction instruction is performed at a default location.

Step S516: Obtaining the preset priority data, and selecting a virtual target within the interaction distance range according to the priority data.

Specifically, if it is detected that there is a virtual target within the interaction distance range corresponding to the interaction instruction, step S516 is performed. The preset priority data refers to priority condition data for selecting various types of virtual targets, and a condition of preferentially selecting a virtual target may be preset according to actual requirements. A setup interface may be provided, so that a user sets a condition of selecting a virtual target, for example, setting, in a game scenario by using the provided setup interface, a distance priority, a target attribute value priority, or the like. The priority data may indicate preferentially selecting a virtual target with a smaller distance, or preferentially selecting a virtual target with a smaller attribute value, or the like.

In an embodiment, the terminal obtains, by using the setup interface, the priority data input by the user, and may store the priority data according to an identifier of the controlled virtual character. The terminal may further upload the identifier of the controlled virtual character and the corresponding priority data to the server for storage. Therefore, when the terminal cannot locally obtain the priority data, the terminal may obtain the priority data corresponding to the identifier of the controlled virtual character from the server.

Step S518: Controlling, according to the interaction instruction, the controlled virtual character to interact with the selected virtual target.

Specifically, after a virtual target is selected, the controlled virtual character is controlled, according to the interaction instruction, to interact with the selected virtual target. Besides, data generated by selecting a virtual target and controlling, according to the interaction instruction, the controlled virtual character to interact with the selected virtual target may be uploaded to the server, thereby implementing data synchronization.

Figure 6:
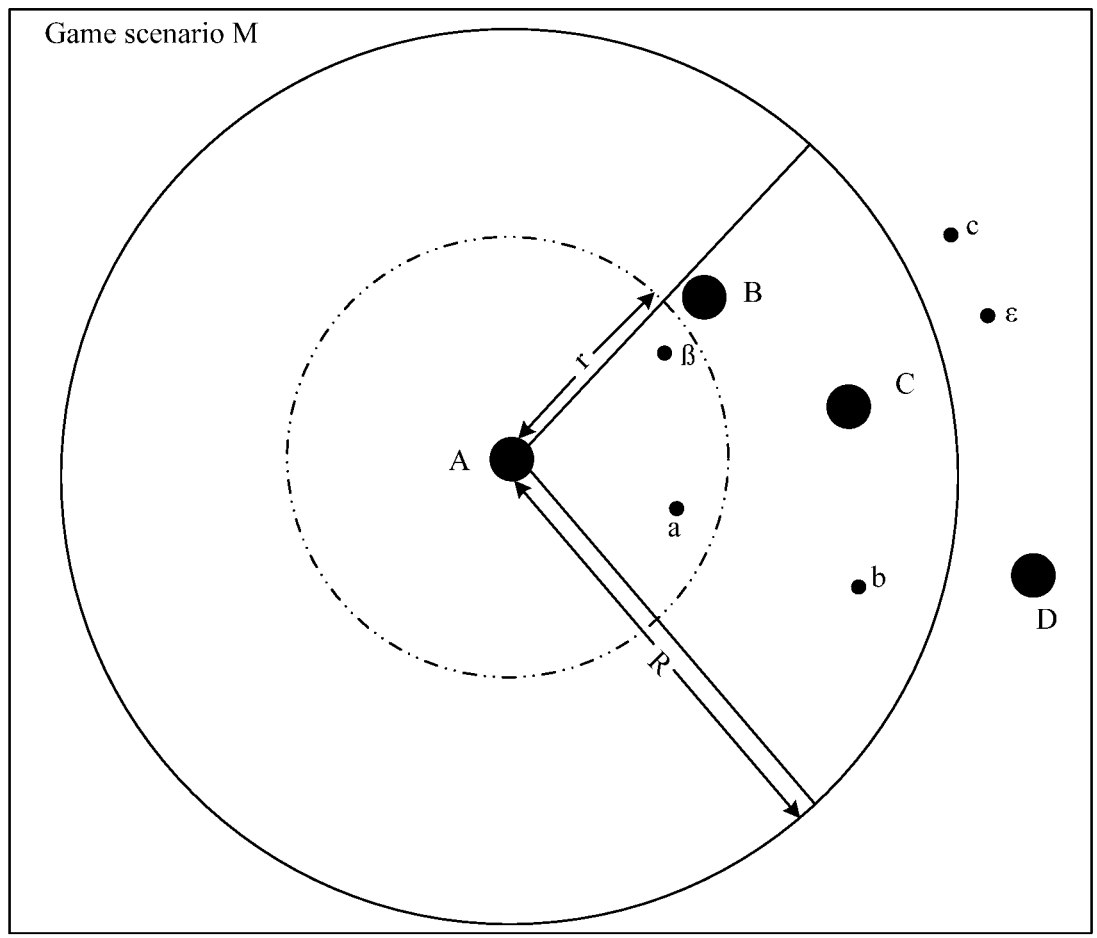
FIG. 6 is a schematic diagram of a process of applying a method for controlling interaction with a virtual target to a game scenario.

To describe the foregoing method for controlling interaction with a virtual target more clearly, the following describes, with reference to FIG. 6, a process of applying the method for controlling interaction with a virtual target to a game scenario.

As shown in FIG. 6, in a game scenario M, a controlled virtual character A is a short-distance-interaction virtual character, and an interaction instruction input by a user by using an input device is obtained by using an operation interface in the game scenario. In the game scenario M, virtual targets B, C, and D are first-level virtual targets; virtual targets a, b, and c are second-level virtual targets; and virtual targets β and ε are third-level virtual targets.

When an interaction instruction obtained by a terminal is a skill casting instruction, whether there is a virtual target within a range with a distance between a point in the range and the short-distance-interaction virtual character A being less than or equal to an interaction distance R (for example, R=20 meters) corresponding to the skill casting instruction is detected. It can be seen from FIG. 6 that there are first-level virtual targets B and C, second-level virtual targets a and b, and a third-level virtual target β within an interaction distance range corresponding to the skill casting instruction; and there are a first-level virtual target D, a second-level virtual target c, and a third-level virtual target c beyond the interaction distance range corresponding to the skill casting instruction. After levels of all virtual targets within the interaction distance range corresponding to the skill casting instruction are obtained, the first-level virtual targets B and C having the highest level are selected as virtual targets; and a virtual target in the virtual targets B and C having the highest level that is closest to the short-distance-interaction virtual character A, or a virtual target in the virtual targets B and C having the highest level that has the smallest attribute value is selected according to the priority data. For example, if a virtual target in the virtual targets B and C having the highest level that is closest to the short-distance-interaction virtual character A is to be selected according to the priority data, a distance between the first-level virtual target B and the short-distance-interaction virtual character A is 1.5 meters, and a distance between the first-level virtual target C and the short-distance-interaction virtual character A is 3 meters, the first-level virtual target B is selected as the virtual target, and the short-distance-interaction virtual character A is controlled, according to the interaction instruction, to interact with the selected first-level virtual target B. It is assumed that there is no first-level virtual target, and there are only second-level virtual targets and third-level virtual targets within an interaction distance range corresponding to the skill casting instruction, the second-level virtual targets are first selected, and a virtual target in the second-level virtual targets that is closest to the short-distance-interaction virtual character A or a virtual target in virtual targets having the highest level that has the smallest attribute value is selected according to the priority data.

Figure 7:
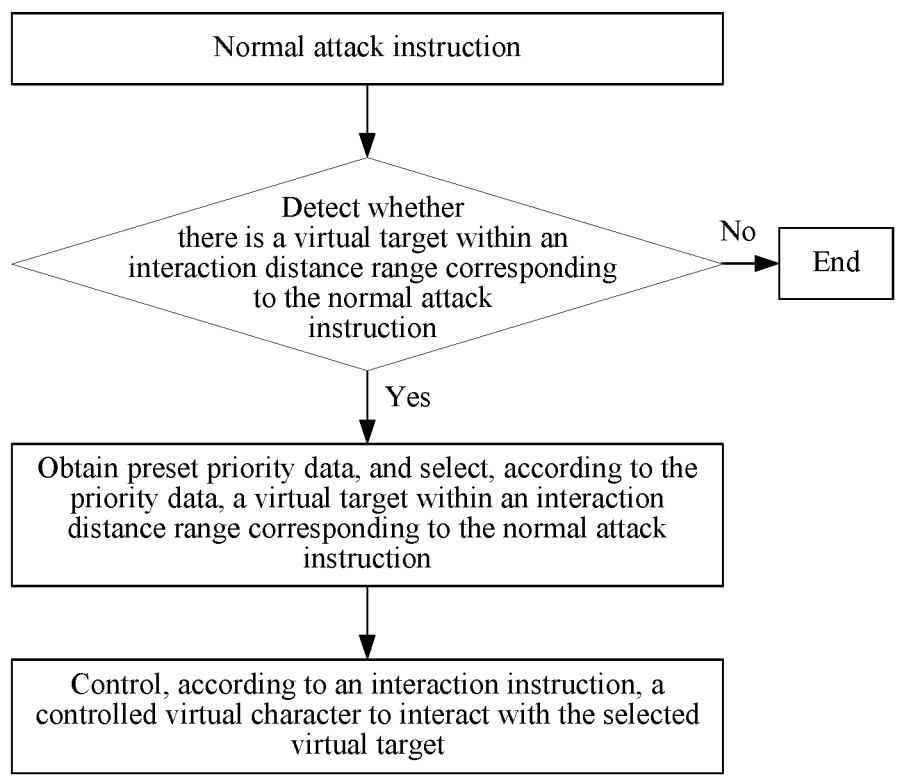
FIG. 7 is a logic flowchart of performing a skill casting instruction according to an embodiment.

If there is no virtual target within the interaction distance range corresponding to the skill casting instruction, the interaction instruction is ended or performed according to a further classification result of a skill. Refer to FIG. 7 for a logic flowchart of performing a skill casting instruction.

Figure 8:
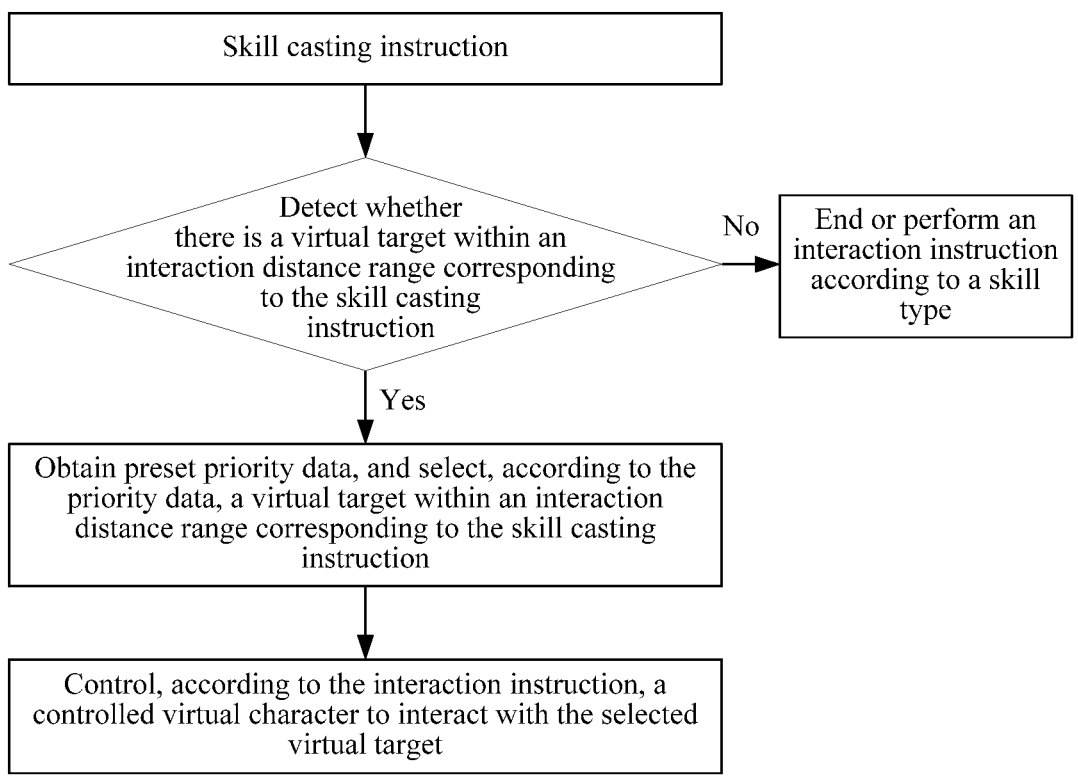
FIG. 8 is a logic flowchart of performing a normal attack instruction according to an embodiment.

When an obtained interaction instruction is a normal attack instruction, whether there is a virtual target within a range, a distance between a point in the range and the short-distance-interaction virtual character A being less than or equal to an interaction distance r (for example, r=5 meters), corresponding to the normal attack instruction is detected. It can be seen from FIG. 6 that there is the second-level virtual target a and the third-level virtual target β within an interaction distance range corresponding to the normal attack instruction; and there are the first-level virtual targets B, C, and D, the second-level virtual targets b and c, and the third-level virtual target c beyond the interaction distance range corresponding to the normal attack instruction. After levels of all virtual targets within the interaction distance range corresponding to the normal attack instruction are obtained, the second-level virtual target a having a highest level is selected as a virtual target. It is assumed that there is no virtual target within the interaction distance range corresponding to the normal attack instruction, and the normal attack instruction is directly ended. Refer to FIG. 8 for a logic flowchart of performing a normal attack instruction.

In addition, if the controlled virtual character A is a long-distance-interaction virtual character, except a different detection range, a process of controlling the controlled virtual character A to interact with a virtual target is the same as the foregoing process, and details are not described herein again.

Figure 9:
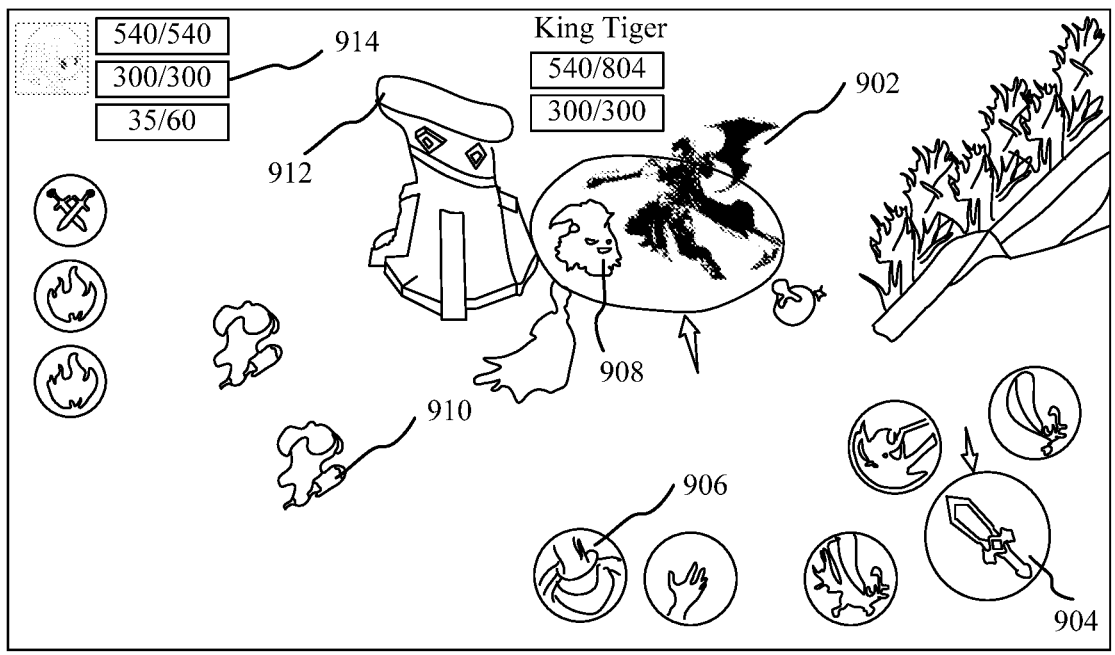
FIG. 9 is a diagram of an operation interface in a specific game scenario.

The method for controlling interaction with a virtual target provided in this embodiment of the present disclosure is preferably applied to online games, and in particular, to an MOBA (Multiplayer Online Battle Arena Games, multiplayer online battle arena games) type of games. As shown in FIG. 9, in a specific game scenario, a hero 902 is a controlled virtual character, and a user may input a normal attack instruction by clicking a normal attack button 904 in an operation interface in the game scenario, or input a skill casting instruction by clicking a skill button 906. In the game scenario, a hero 908 is a first-level virtual target that is hostile to the hero 902, a monster 910 is a second-level virtual target that is hostile to the hero 902, and a building 912 is a third-level virtual target that is hostile to the hero 902.

When a user clicks the normal attack button 904, an interaction distance range is formed in the game scenario, and whether there is a virtual target within the interaction distance range is detected. It can be seen from FIG. 9 that there is only the hero 908 within an interaction distance range corresponding to the skill casting instruction, and therefore, the hero 902 selects the hero 908 having a highest level as a virtual target. It is assumed that there is no virtual target within the interaction distance range corresponding to a normal attack instruction, and therefore, normal attack instruction is directly ended.

In addition, a controlled virtual character and each virtual target in the game scenario have corresponding attribute values. As shown in FIG. 9, a display frame 914 may show attribute values of the hero 902, such as a blood value and an experience value. When there are multiple virtual targets having the highest level within an interaction range of the hero 902, a virtual target in the virtual targets having the highest level that is closest to the hero 902, or a virtual target in the virtual targets having the highest level that has a smallest attribute value is selected for interaction according to the priority data.

According to embodiments of the present disclosure, the disclosed method for controlling interaction with a virtual target can provide intelligent target selection and skill casting capabilities to select a desired virtual target for current interaction. That is, the selected virtual target can be a good choice for implementing successful game strategy (e.g., achieving a maximum damage in battle, reaching most effects of a casted skill). The disclosed method can address the issue that users (e.g., new players, unexperienced players) have no idea on what object to select as interaction target, and operational manual errors occurred when selecting interaction target (e.g., due to small screen of cell phone). Further, the disclosed method can, by implementing the intelligent target selection and skill casting process, avoid undesired performance results caused by a simple automatic selection rule. User operations can be reduced while achieving desired interaction outcomes, user experience can thus be enhanced.

Figure 10:
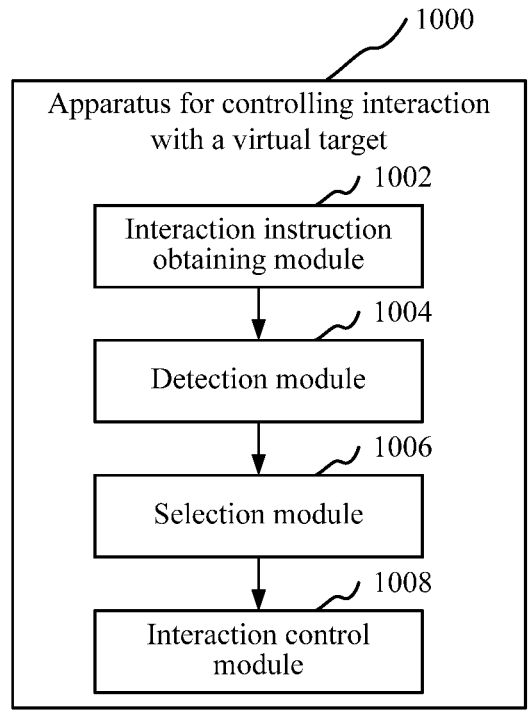
FIG. 10 is a block diagram of an internal structure of an apparatus for controlling interaction with a virtual target according to an embodiment.

As shown in FIG. 10, an apparatus 1000 for controlling interaction with a virtual target includes an interaction instruction obtaining module 1002, a detection module 1004, a selection module 1006, and an interaction control module 1008.

The interaction instruction obtaining module 1002 is configured to obtain an interaction instruction.

The detection module 1004 is configured to detect whether there is a virtual target within an interaction distance range corresponding to the obtained interaction instruction.

The selection module 1006 is configured to obtain preset priority data, and select a virtual target within the interaction distance range according to the priority data.

The interaction control module 1008 is configured to control, according to the interaction instruction, a controlled virtual character to interact with the selected virtual target.

Figure 11:
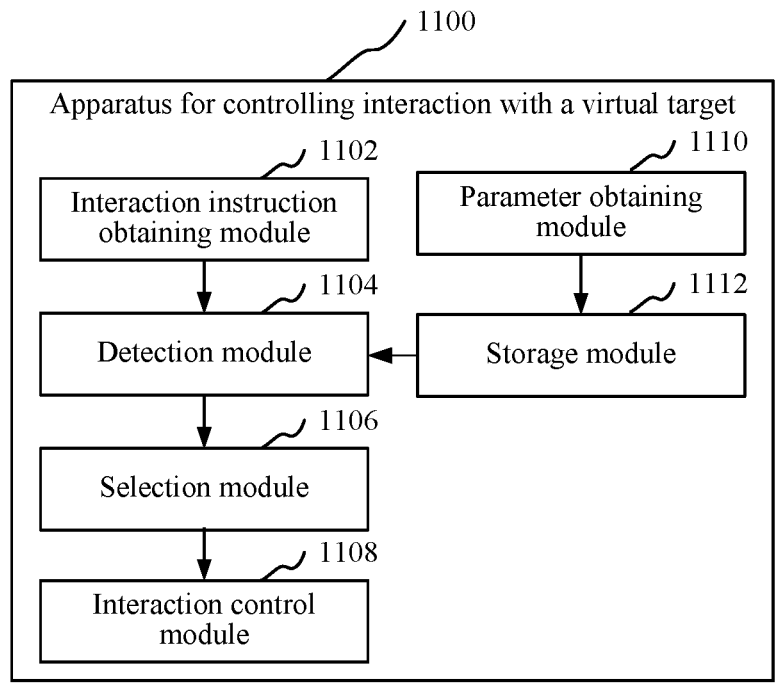
FIG. 11 is a block diagram of an internal structure of an apparatus for controlling interaction with a virtual target according to another embodiment.

As shown in FIG. 11, in another embodiment, an apparatus 1100 for controlling interaction with a virtual target includes an interaction instruction obtaining module 1102, a detection module 1104, a selection module 1106, an interaction control module 1108, a parameter obtaining module 1110, and a storage module 1112.

The interaction instruction obtaining module 1102 is configured to obtain an interaction instruction.

The detection module 1104 is configured to detect whether there is a virtual target within an interaction distance range corresponding to the obtained interaction instruction.

The selection module 1106 is configured to obtain preset priority data, and select a virtual target within the interaction distance range according to the priority data.

The interaction control module 1108 is configured to control, according to the interaction instruction, a controlled virtual character to interact with the selected virtual target.

The parameter obtaining module 1110 is configured to obtain, by means of a setup interface, a first parameter and a second parameter that are inputted and correspond to a type of the controlled virtual character.

The storage module 1112 is configured to store a correspondence between the type of the controlled virtual character and the first parameter and the second parameter.

Further, the interaction instruction obtaining module 1102 is further configured to obtain the interaction instruction after the interaction control module 1108 controls, according to the interaction instruction, the controlled virtual character to interact with the selected virtual target.

Further, the detection module 1104 is further configured to detect whether a distance between the currently selected virtual target and the controlled virtual character goes beyond a first range corresponding to the interaction instruction, and if yes, whether the currently selected virtual target falls within a second range corresponding to the interaction instruction is detected by using the detection module 1104, and if yes, the controlled virtual character is controlled, by using the interaction control module 1108, to move to enable the controlled virtual character to interact with the currently selected virtual target.

If the distance between the currently selected virtual target and the controlled virtual character falls within the first range, the controlled virtual character is further controlled, by using the interaction control module 1108 according to the interaction instruction, to interact with the selected virtual target.

The first range is a sum of an interaction distance corresponding to the interaction instruction and the first parameter; and the second range is a sum of the interaction distance corresponding to the interaction instruction and the second parameter.

In an embodiment, the detection module 1104 is further configured to detect, when the distance between the currently selected virtual target and the controlled virtual character goes beyond the second range, whether there is a virtual target within the interaction distance range corresponding to the interaction instruction, and if yes, preset priority data is obtained by using the selection module 1106; a virtual target within the interaction distance range is selected according to the priority data; and the controlled virtual character is controlled, by using the interaction control module 1108 according to the interaction instruction, to interact with the selected virtual target.

Figure 12:
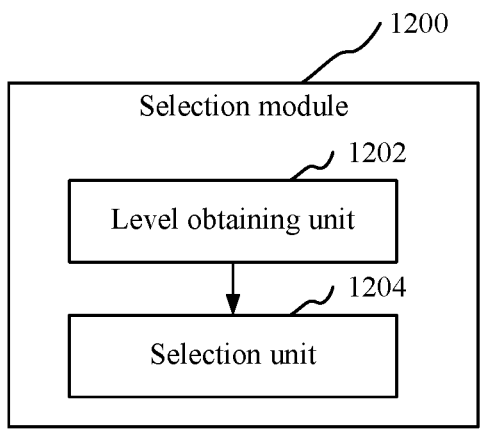
FIG. 12 is a block diagram of an internal structure of a selected module according to an embodiment.

As shown in FIG. 12, in an embodiment, a selection module 1200 includes a level obtaining unit 1202 and a selection unit 1204.

The level obtaining unit 1202 is configured to obtain a level included a virtual target within a interaction distance range.

The selection unit 1204 is configured to select virtual targets having a highest level, and a virtual target in the virtual targets having the highest level that is closest to the controlled virtual character, or a virtual target in the virtual targets having the highest level that has the smallest attribute value is selected according to the priority data.

A person of ordinary skill in the art may understand that all or some of the processes of the methods in the foregoing embodiments may be implemented by a computer program instructing relevant hardware. The program may be stored in a non-volatile computer readable storage medium. When the program runs, the processes of the methods in the foregoing embodiments are performed. The storage medium may be a magnetic disk, an optical disc, a read-only memory (Read-Only Memory, ROM), and the like.

The foregoing embodiments merely describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method for controlling interaction with a virtual target, comprising:
    obtaining an interaction instruction;
    detecting a plurality of virtual targets within an interaction distance range corresponding to the interaction instruction;
    first-prioritizing the plurality of virtual targets according to target types to obtain a first-prioritized plurality of virtual targets, wherein a human-type target is prioritized ahead of an animal-type target, and the animal-type target is prioritized ahead of a structure-type target;
    second-prioritizing the first-prioritized plurality of virtual targets according to preset priority data of the first-prioritized plurality of virtual targets to obtain at least one second-prioritized virtual target as a selected virtual target; and
    controlling, according to the interaction instruction, a controlled virtual character to interact with the selected virtual target;
    wherein the preset priority data is configured via a setup interface and includes a distance value and a target attribute value, and the target attribute value relates to one or both of a blood value and an experience value of the first-prioritized plurality of virtual targets.

2. The method according to claim 1, further comprising:
    obtaining, through the setup interface, a first parameter and a second parameter corresponding to a type of the controlled virtual character; and
    storing a correspondence between the type of the controlled virtual character and the first parameter and the second parameter.

3. The method according to claim 2, wherein after the controlling, according to the interaction instruction, a controlled virtual character to interact with the selected virtual target, the method further comprises:
    obtaining the interaction instruction;
    detecting whether a distance between the currently selected virtual target and the controlled virtual character is beyond a first range corresponding to the interaction instruction;
    when the distance is beyond the first range, detecting whether the currently selected virtual target falls within a second range corresponding to the interaction instruction;
    when the currently selected virtual target falls within the second range, performing control to move the controlled virtual character to enable the controlled virtual character to interact with the currently selected virtual target; and
    when the distance is within the first range, continuing controlling, according to the interaction instruction, the controlled virtual character to interact with the selected virtual target, wherein the first range is a sum of an interaction distance corresponding to the interaction instruction and the first parameter; and the second range is a sum of the interaction distance corresponding to the interaction instruction and the second parameter.

4. The method according to claim 3, further comprising:
    detecting, when the distance between the currently selected virtual target and the controlled virtual character is beyond the second range, whether there is a virtual target within the interaction distance range corresponding to the interaction instruction;
    when the virtual targets are detected within the interaction distance range, obtaining the preset priority data; selecting the virtual target within the interaction distance range according to the priority data, and controlling, according to the interaction instruction, the controlled virtual character to interact with the selected virtual target.

5. The method according to claim 2, wherein the first-prioritized plurality of virtual targets includes a first number of human-type virtual targets and a second number of animal-type virtual targets, and second-prioritizing the first-prioritized plurality of virtual targets includes:
    second-prioritizing the first number of human-type virtual targets according to preset priority data of the first number of human-type virtual targets.

6. The method according to claim 5, further comprising:
    after second-prioritizing the first number of human-type virtual targets, second-prioritizing the second number of animal-type virtual targets.

7. The method according to claim 5, wherein a first human-type virtual target of a first blood level is prioritized ahead of a second human-type virtual target of a second blood level higher than the first blood level.

8. The method according to claim 2, further comprising:
    displaying on a screen the one or both of the blood value and the experience value in numerals.

9. A terminal, comprising a memory and a processor, the memory storing an instruction, and the instruction enabling, when being performed by the processor, the processor to perform the following steps:
    obtaining an interaction instruction;
    detecting a plurality of virtual targets within an interaction distance range corresponding to the interaction instruction;
    first-prioritizing the plurality of virtual targets according to target types to obtain a first-prioritized plurality of virtual targets, wherein a human-type target is prioritized ahead of an animal-type target, and the animal-type target is prioritized ahead of a structure-type target;
    second-prioritizing the first-prioritized plurality of virtual targets according to preset priority data of the first-prioritized plurality of virtual targets to obtain at least one second-prioritized virtual target as a selected virtual target; and
    controlling, according to the interaction instruction, a controlled virtual character to interact with the selected virtual target;
    wherein the preset priority data is configured via a setup interface and includes a distance value and a target attribute value, and the target attribute value relates to one or both of a blood value and an experience value of the first-prioritized plurality of virtual targets.

10. The terminal according to claim 9, wherein the processor is further configured to perform steps of:
   obtaining, through the setup interface, a first parameter and a second parameter corresponding to a type of the controlled virtual character; and
   storing, in the memory, a correspondence between the type of the controlled virtual character and the first parameter and the second parameter.

11. The terminal according to claim 10, wherein after the step of controlling, according to the interaction instruction, the controlled virtual character to interact with the selected virtual target, the processor is further configured to perform the following steps:
   obtaining the interaction instruction;
   detecting whether a distance between the currently selected virtual target and the controlled virtual character is beyond a first range corresponding to the interaction instruction;
   when the distance is beyond the first range, detecting whether the currently selected virtual target falls within a second range corresponding to the interaction instruction;
   when the currently selected virtual target falls within the second range, performing control to move the controlled virtual character to enable the controlled virtual character to interact with the currently selected virtual target; and
   when the distance is within the first range, continuing to control, according to the interaction instruction, the controlled virtual character to interact with the selected virtual target, wherein the first range is a sum of an interaction distance corresponding to the interaction instruction and the first parameter; and the second range is a sum of the interaction distance corresponding to the interaction instruction and the second parameter.

12. The terminal according to claim 11, wherein the processor is further configured to perform the following steps:
   detecting, when the distance between the currently selected virtual target and the controlled virtual character is beyond the second range, whether there is a virtual target within the interaction distance range corresponding to the interaction instruction;
   when the virtual targets are detected within the interaction distance range, obtaining the preset priority data, selecting the virtual target within the interaction distance range according to the priority data, and controlling, according to the interaction instruction, the controlled virtual character to interact with the selected virtual target.

13. The terminal according to claim 9, wherein the first-prioritized plurality of virtual targets includes a first number of human-type virtual targets and a second number of animal-type virtual targets, and second-prioritizing the first-prioritized plurality of virtual targets includes:
   second-prioritizing the first number of human-type virtual targets according to preset priority data of the first number of human-type virtual targets.

14. The terminal according to claim 9, further comprising: displaying on a screen the one or both of the blood value and the experience value in numerals.

15. A non-transitory storage medium that stores computer readable instructions, the computer readable instructions enabling, when being performed by one or more processors, the one or more processors to perform the following steps:
   obtaining an interaction instruction;
   detecting a plurality of virtual targets within an interaction distance range corresponding to the interaction instruction;
   first-prioritizing the plurality of virtual targets according to target types to obtain a first-prioritized plurality of virtual targets, wherein a human-type target is prioritized ahead of an animal-type target, and the animal-type target is prioritized ahead of a structure-type target;
   second-prioritizing the first-prioritized plurality of virtual targets according to preset priority data of the first-prioritized plurality of virtual targets to obtain at least one second-prioritized virtual target as a selected virtual target; and
   controlling, according to the interaction instruction, a controlled virtual character to interact with the selected virtual target;
   wherein the preset priority data is configured via a setup interface and includes a distance value and a target attribute value, and the target attribute value relates to one or both of a blood value and an experience value of the first-prioritized plurality of virtual targets.

16. The non-transitory storage medium according to claim 15, wherein the computer readable instructions further enable the one or more processors to perform:
   obtaining, through the setup interface, a first parameter and a second parameter corresponding to a type of the controlled virtual character; and
   storing a correspondence between the type of the controlled virtual character and the first parameter and the second parameter.

17. The non-transitory storage medium according to claim 16, wherein after the controlling, according to the interaction instruction, a controlled virtual character to interact with the selected virtual target, the computer readable instructions further enable the one or more processors to perform:
   obtaining the interaction instruction;
   detecting whether a distance between the currently selected virtual target and the controlled virtual character is beyond a first range corresponding to the interaction instruction;
   when the distance is beyond the first range, detecting whether the currently selected virtual target falls within a second range corresponding to the interaction instruction;
   when the currently selected virtual target falls within the second range, performing control to move the controlled virtual character to enable the controlled virtual character to interact with the currently selected virtual target; and
   when the distance is within the first range, continuing controlling, according to the interaction instruction, the controlled virtual character to interact with the selected virtual target, wherein the first range is a sum of an interaction distance corresponding to the interaction instruction and the first parameter; and the second range is a sum of the interaction distance corresponding to the interaction instruction and the second parameter.

18. The non-transitory storage medium according to claim 17, wherein the computer readable instructions further enable the one or more processors to perform:
   detecting, when the distance between the currently selected virtual target and the controlled virtual character is beyond the second range, whether there is a virtual target within the interaction distance range corresponding to the interaction instruction;

when the virtual targets are detected within the interaction distance range, obtaining the preset priority data; selecting the virtual target within the interaction distance range according to the priority data, and controlling, according to the interaction instruction, the controlled virtual character to interact with the selected virtual target.

19. The non-transitory storage medium according to claim 15, wherein the first-prioritized plurality of virtual targets includes a first number of human-type virtual targets and a second number of animal-type virtual targets, and second-prioritizing the first-prioritized plurality of virtual targets includes:

second-prioritizing the first number of human-type virtual targets according to preset priority data of the first number of human-type virtual targets.

20. The non-transitory storage medium according to claim 15, further comprising:

displaying on a screen the one or both of the blood value and the experience value in numerals.

* * * * *